United States Patent [19]
Elser et al.

[11] Patent Number: 5,139,106
[45] Date of Patent: Aug. 18, 1992

[54] AUXILIARY POWER STEERING SYSTEM, ESPECIALLY FOR MOTOR VEHICLES

[75] Inventors: Dieter Elser, Essingen; Heinrich Holub, Schwäbsich, both of Fed. Rep. of Germany

[73] Assignee: Zahnradfabrik Friedrichshafen, AG, Friedrichshafen, Fed. Rep. of Germany

[21] Appl. No.: 640,362

[22] PCT Filed: Sep. 6, 1989

[86] PCT No.: PCT/EP89/01038
 § 371 Date: Jan. 29, 1991
 § 102(e) Date: Jan. 29, 1991

[87] PCT Pub. No.: WO90/02679
 PCT Pub. Date: Mar. 22, 1990

[30] Foreign Application Priority Data
Sep. 10, 1988 [DE] Fed. Rep. of Germany ....... 3830830

[51] Int. Cl.⁵ .................. B62D 5/08; F15B 9/10
[52] U.S. Cl. .................. 180/148; 91/375 A; 91/401; 91/437
[58] Field of Search ............. 80/148, 149; 91/375, 91/401, 437

[56] References Cited
U.S. PATENT DOCUMENTS

| | | | |
|---|---|---|---|
| 4,285,266 | 8/1981 | Elser | 91/375 A |
| 4,367,672 | 1/1983 | Elser | 91/375 A |
| 4,368,794 | 1/1983 | Elser et al. | 91/375 A |
| 4,373,598 | 2/1983 | Elser | 91/375 A |
| 4,417,501 | 11/1983 | Elser | 91/375 A |
| 4,648,307 | 3/1987 | Rabe | 91/375 A |
| 4,773,303 | 9/1988 | Stroud | 91/375 A |

*Primary Examiner*—Mitchell J. Hill
*Attorney, Agent, or Firm*—Albert M. Zalkind

[57] ABSTRACT

The invention relates to an auxiliary power steering system, especially for motor vehicles having a double acting servocylinder with two working chambers and a servopiston. A hydraulic steering limitation device has a valve that coacts with the servopiston responsive to a predetermined extent of power stroke to open a flow path from the pressurized working chamber to the tank connected working chamber to promptly stop the power stroke leaving the servopiston in position for prompt reversal of steering direction under pressure power. A stationary flow channel member extends the substantial length of the servocylinder and passes through a bore in the servopiston with which it has a sliding relationship. At a predetermined end of a power stroke, bores and a passage in the channel member communicate with the working chambers of the servocylinder to equalize the pressure at tank pressure for stopping the power stroke.

7 Claims, 1 Drawing Sheet

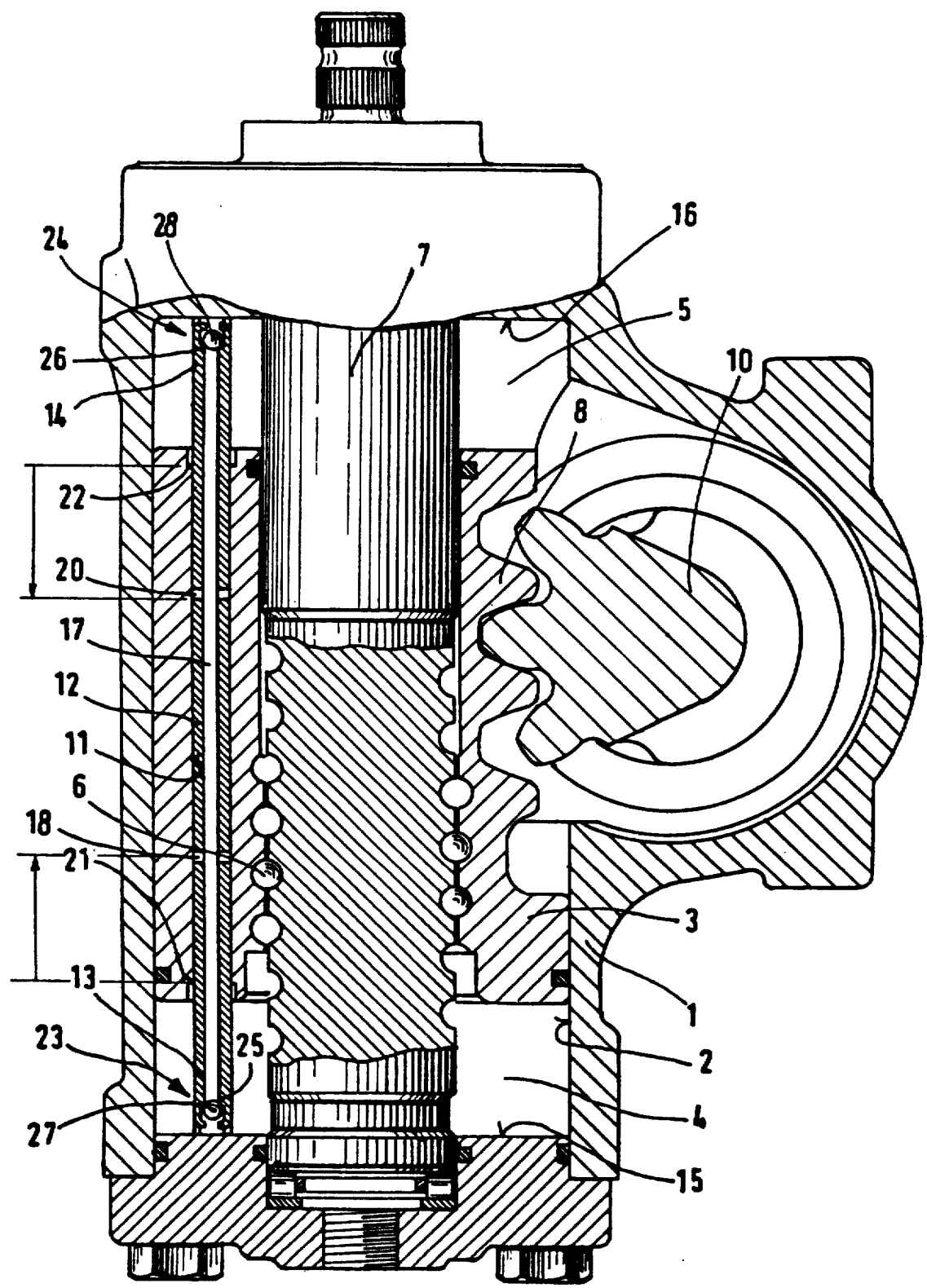

AUXILIARY POWER STEERING SYSTEM, ESPECIALLY FOR MOTOR VEHICLES

The object of the invention is to improve the operation and construction of known auxiliary power steering systems that effect valving to limit the power stroke.

BACKGROUND OF THE INVENTION

An auxiliary power steering system is known from DE-PS (German patent) 1,750,263. Such design is disadvantageous in case of reversal of the steering direction when the servopiston is to be reversed from the end of a power stroke in an opposite steering direction toward the direction of neutral position. The initial movement must take place without auxiliary power support but by human force on the manual steering wheel. Only after the servopiston has been reversed a distance toward neutral position can flow connection between the two working chambers of the servocylinder be interrupted and servopressure used to reverse the servopiston.

SUMMARY OF THE INVENTION

The invention comprises a channel member having a bore and being fixed in the working cylinder extending between the end walls thereof. The servopiston has a bore through which the channel member extends sealingly while the servopiston rides up and down in the servocylinder.

Transverse bores are provided through the channel member at spaced distances which are predetermined to control the extent that the servopiston will move after pressurization of either chamber to a point where it will stop short of effecting further steering force before the vehicle steering linkage is mechanically stopped by engagement with an abutment in each direction of steering.

Each face of the servopiston has a flow control edge that coacts with a respective transverse bore to permit flow from the pressurized chamber to the opposite chamber, viz., the chamber connected to a tank.

Accordingly, both chambers are at tank pressure whereby power stroke of the servopiston ceases.

At that point the driver of the vehicle can reverse the steering direction with virtually immediate pressurization by use of a conventional steering control valve. Thus, the chamber into which the pressurized chamber transfers its pressure flow can be quickly pressurized in the event that the driver wishes to reverse the first direction of steering.

In order to prevent loss of pressure when either working chamber is pressurized an ordinary ball check valve means is used in the respective end of the channel member in each working chamber.

BRIEF DESCRIPTION OF THE DRAWING

The single FIG. 1 of the drawing shows a longitudinal section through the essentials of the invention.

DETAILED DESCRIPTION OF THE INVENTION

A steering gear housing contains a servocylinder 2. In servocylinder 2 a servopiston 3 is reciprocally movable and divides the servocylinder 2 into working chambers 4 and 5.

It will be understood that the arrangement is conventional and pressurization of one chamber is effected while tank connection of the other chamber is effected, controlled at the will of a vehicle driver who utilizes conventional valving (not shown) responsive to rotation of the steering wheel for selectively pressurizing one chamber while providing for return oil to a tank of the other.

A flow channel member 12 in the form of a rod-like tube passes with a sliding relationship as the servopiston reciprocates wherein the rod-like tube fits sealingly in a bore 11 of the servopiston 3. It will be understood that the channel member 12 as well as the bore are parallel to the axis of the servocylinder and that the respective ends 13 and 14 of the channel member engage against the end walls 15 and 16 of servocylinder 2 the channel member being stationary.

Channel member 12 has a longitudinal flow channel bore 17 as well as two predeterminedly spaced transverse bores 18 and 20. The spacing between bores 18 and 20 and the ends 14 and 113 of the channel member 12 essentially corresponds to a predetermined portion of the length of the servopiston 3.

By reference to the changes shown in red the drawing filed for approval has vertical arrows drawn for directions of reversible movement of the piston, the length of the arrows corresponds to the predetermined power stroke of the piston in each direction prior to being stopped mechanically by an abutment limiting the angle of steering in each direction.

Thus, the bores 18 and 20 coact with flow control edges 21 and 22 which, in this instance, are arranged in recesses at the ends of bore 11, although they could be located on the end faces of servopiston 3.

At each end of channel member 12 there is a simple ball springless check valve, respectively 23 and 24, coacting with respective valve seats 25 and 26 machined into the ends of the channel member 12. Portions of such ends are swaged over to effect cages for the respective ball valves.

OPERATION

Assuming the servopiston 3 is centered as in Fig. 1 and via a conventional steering control valve (not shown) operable by a vehicle driver at a steering wheel (not shown) either working chamber 4 or 5 can be pressurized.

If now the working chamber 5 is pressurized for a power stroke steering operation, the working chamber 4 is tank connected and servopiston 3 moves down, as viewed in FIG. 1, thereby assisting the manual steering effective through ball chain 18, rack rotates pinion 10 to actuate a vehicle steering linkage (not shown) all in a well known manner.

When the servopiston power stroke transverses the distance indicated by the length of the downwardly pointed arrow, the flow control edge 22 will be in communication with the port 20 and thence with flow passage 17 to relieve flow from pressurized working chamber 5 to the relatively low pressure tank connected working chamber 4. The power stroke ceases.

The pressure equalizing flow between the working chambers stops the power stroke at a predetermined distance, depending on the spacing between the control edges 21, 22 on the piston and a respective transverse port 20, 18 via passage 17 in either direction of power stroke at any distance short of the point where a mechanical stop mechanism forcefully prevents further turning of the steering wheels.

A respective ball check valve 24, 25 will be pressure closed immediately against its seat depending on the pressurizing of a respective working chamber to effect rapid pressure buildup for a return power stroke.

We claim:

1. Auxiliary power steering, especially for vehicles, having a double acting servocylinder (2) divided by a servopiston (3) into working chambers (4,5); of the kink utilizing a steering valve control arrangement wherein when either working chamber is pressurized the other is connected to a tank; including means for connecting a pressurized working chamber, responsive to a predetermined extent of power stroke to the other working chamber at that time being connected to a tank;

the improvement wherein said means comprises a stationary flow channel member (12) in said servocylinder and having transverse ports (20,21) with a flow channel (17) connecting said ports; said servopistons having respective flow control edges (21,22) disposed to prevent flow between respective working chambers during a steering operation when either chamber is being pressurized and the other is connected to a tank; said ports each being spaced a longitudinal distance from a respective flow control edge so that during a power stroke when a working chamber is pressurized the respective flow control edge will align with the respective port at a predetermined power stroke distance and thus via the longitudinal passage to the opposite working chamber which is at tank pressure; including check valve means (23,24) disposed to prevent flow passage between respective working chambers when either is pressurized.

2. Auxiliary power steering as set forth in claim 1, wherein said check valve means (23, 24) are ball valves: including respective seats (25,26) disposed in said flow channel 17.

3. Auxiliary power steering as set forth in claim 2, wherein said servocylinder has end walls (15,16) and said flow channel member extends therebetween.

4. Auxiliary power steering as set forth in claim 1, wherein said flow channel member (12) comprises a tube having said passage (17); said servopiston (3) comprising a bore (11) having a sealingly sliding fit with said tube.

5. Auxiliary power steering as set forth in claim 1, wherein said check valve means (23,24) are ball valves; including respective seats (25,26) disposed in said flow channel (7); wherein said servocylinder has end walls (15,16) and said flow channel member extends therebetween.

6. Auxiliary power steering as set forth in claim 1, wherein said check valve means (23,24) are ball valves; including respective seats (25,26) disposed in said flow channel (17); wherein said flow channel member (12) comprises a tube having said passage (17); said servopiston (3) comprising a bore (11) having a sealingly sliding fit with said tube.

7. Auxiliary power steering as set forth in claim 1, wherein said check valve means (23,24) are ball valves; including respective seats (25, 26) disposed in said flow channel (17); wherein said servocylinder has end walls (15, 16) and said flow channel member extends therebetween; said flow channel member (12) comprises a tube having said passage (17); said servopiston (3) comprising a bore (11) having a sealingly sliding fit with said tube.

* * * * *